(12) United States Patent
Sodagar (10) Patent No.: US 11,528,313 B2
(45) Date of Patent: *Dec. 13, 2022

(54) METHODS AND APPARATUSES FOR DYNAMIC ADAPTIVE STREAMING OVER HTTP

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/470,726

(22) Filed: Sep. 9, 2021

(65) Prior Publication Data

US 2021/0409477 A1    Dec. 30, 2021

Related U.S. Application Data

(63) Continuation of application No. 17/063,995, filed on Oct. 6, 2020, now Pat. No. 11,184,420.

(60) Provisional application No. 62/957,666, filed on Jan. 6, 2020.

(51) Int. Cl.
*H04L 65/65* (2022.01)
*H04L 67/02* (2022.01)
*H04N 21/84* (2011.01)

(52) U.S. Cl.
CPC .............. *H04L 65/65* (2022.05); *H04L 67/02* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 6,388,969 B1 | 5/2002 | Lebowsky et al. | |
| 9,646,162 B2* | 5/2017 | Giladi | H04L 67/02 |
| 2005/0079503 A1 | 4/2005 | Bowtell et al. | |
| 2005/0120073 A1 | 6/2005 | Cho | |
| 2006/0212557 A1 | 9/2006 | Rieger et al. | |
| 2006/0253560 A1 | 11/2006 | Aaltonen | |
| 2011/0320559 A1 | 12/2011 | Foti | |
| 2014/0013375 A1* | 1/2014 | Giladi | H04N 21/23439 725/112 |
| 2014/0115037 A1* | 4/2014 | Liu | H04L 65/1016 709/203 |
| 2016/0366617 A1 | 12/2016 | Chen et al. | |

(Continued)

OTHER PUBLICATIONS

Information technology—Dynamic adaptive streaming over HTTP (DASH)—Part 8: Session-based DASH operations, ISO/IEC WD 23009-8, Jan. 2020. (18 pages).

*Primary Examiner* — Lashonda Jacobs-Burton
(74) *Attorney, Agent, or Firm* — ArentFox Schiff LLP (57) ABSTRACT

Aspects of the disclosure provide methods, apparatuses, and a non-transitory computer-readable storage medium for receiving media data. One apparatus includes processing circuitry that receives a media presentation description (MPD) file including an essential property descriptor that is associated with a session-based description (SBD) file and includes a key-value element. The processing circuitry determines a value in the SBD file corresponding to a key in the key-value element. The processing circuitry sends a request to a server based on the corresponding value.

20 Claims, 5 Drawing Sheets

(56) References Cited

U.S. PATENT DOCUMENTS

2017/0180565 A1\* 6/2017 Chowdhury ........ H04L 12/1407
2019/0222881 A1   7/2019 Hirabayashi et al.
2020/0351567 A1\* 11/2020 Liu ..................... H04N 21/222

\* cited by examiner

METHODS AND APPARATUSES FOR DYNAMIC ADAPTIVE STREAMING OVER HTTP

INCORPORATION BY REFERENCE

This present application is a continuation of U.S. patent application Ser. No. 17/063,995, "METHODS AND APPARATUSES FOR DYNAMIC ADAPTIVE STREAMING OVER HTTP" filed on Oct. 6, 2020, now U.S. Pat. No. 11,184,420, which claims the benefit of priority to U.S. Provisional Application No. 62/957,666, "SIMPLIFIED MULTI-LEVEL SBD AND QUERY SIGNALING IN MPD" filed on Jan. 6, 2020. The entire disclosures of the prior applications are incorporated by reference herein in their entirety.

TECHNICAL FIELD

The present disclosure describes embodiments generally related to methods and apparatuses for dynamic adaptive streaming over hypertext transfer protocol (DASH).

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Moving picture expert group (MPEG) dynamic adaptive streaming over hypertext transfer protocol (DASH) provides a standard for streaming multimedia content over IP networks. In the DASH standard, a media presentation description (MPD) is used to provide information for a DASH client to adaptively stream media content by downloading media segments from a DASH server. However, the MPD is generic for all DASH clients. Accordingly, a DASH client may acquire a side file, such as a session-based description (SBD) file, which provides instructions for the client to make the MPD specific for the session.

SUMMARY

Aspects of the disclosure provide apparatuses. One apparatus includes processing circuitry that receives a media presentation description (MPD) file in which an essential property descriptor includes an attribute indicating uniform resource locator (URL) information for a session-based description (SBD) file. The SBD file includes one or more groups of key-value pairs. The processing circuitry receives the SBD file based on the URL information. The processing circuitry sends a request to a server based on the SBD file.

In an embodiment, the essential property descriptor is at one of an MPD level, a period level, an adaptation set level, and a representation level.

In an embodiment, a query of the request is constructed based on a key-value element included in the essential property descriptor and the SBD file.

In an embodiment, whether a value of an identification (ID) attribute included in the essential property descriptor corresponds to a value of an ID attribute included in one of the one or more groups of key-value pairs in the SBD file is determined.

In an embodiment, whether a desired key in a key list attribute included in the key-value element corresponds to a key in a key list attribute included in the one of the one or more groups of key-value pairs in the SBD file is determined based on the value of the ID attribute included in the essential property descriptor being determined to correspond to the value of the ID attribute included in the one of the one or more groups of key-value pairs in the SBD file;

In an embodiment, the query of the request is constructed based on a value associated with the key in the key list attribute included in the one of the one or more groups of key-value pairs in the SBD file based on the desired key in the key list attribute included in the key-value element being determined to correspond to the key in the key list attribute included in the one of the one or more groups of key-value pairs in the SBD file.

In an embodiment, the query of the request is constructed based on a default value associated with the desired key in the key list attribute in the key-value element based on the desired key in the key list attribute in the key-value element being determined not to correspond to any key in the key list attribute included in the one of the one or more groups of key-value pairs in the SBD file.

In an embodiment, whether the key list attribute included in the key-value element includes at least one desired key is determined based on the value of the ID attribute included in the key-value element being determined not to correspond to any value of the ID attribute included in the one or more groups of key-value pairs in the SBD file.

In an embodiment, the query of the request is constructed based on a default value associated with each of the at least one desired key in the key list attribute in the key-value element based on the key list attribute included in the key-value element being determined to include the at least one desired key.

In an embodiment, a multipurpose Internet mail extensions (MIME) type of the SBD file is not signaled.

Aspects of the disclosure provide methods for receiving media data. In one method, an MPD file is received, in which an essential property descriptor includes an attribute indicating URL information for an SBD file. The SBD file includes one or more groups of key-value pairs. The SBD file is received based on the URL information. A request is sent to a server based on the SBD file.

Aspects of the disclosure also provide a non-transitory computer-readable medium storing instructions which when executed by a computer for receiving media data cause the computer to perform any one or a combination of the methods for receiving the media data.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Dynamic Adaptive Streaming Over Hypertext Transfer Protocol (DASH) and Media Presentation Description (MPD)

Dynamic adaptive streaming over hypertext transfer protocol (DASH) is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by a period element in the MPD file. The MPD file can include an availableStartTime attribute for the MPD and a start attribute for each period. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods.

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI). The MPD file can provide the identifiers for each segment. In some examples, the MPD file can also provide byte ranges in the form of a range attribute, which can correspond to the data for a segment within a file accessible by the URL, URN, or URI.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some embodiments, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

II. Session-Based DASH Operation and Session-Based Description (SBD)

It is noted that the MPD file can be generic for all DASH clients. In order to make the MPD file specific for a session of the DASH client, moving picture expert group (MPEG) provides session-based DASH operations. In session-based DASH operations, the DASH client can receive a side file, such as a session-based description (SBD) file, which provides instructions for the DASH client to customize the MPD file per session and possibly per client.

Figure 1:
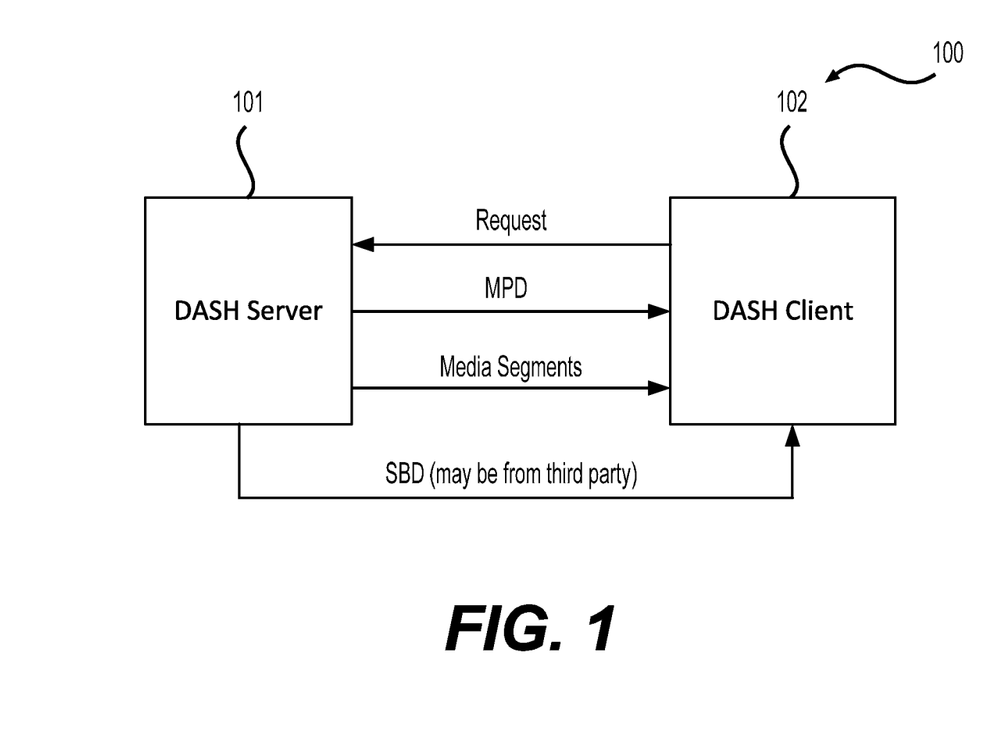
FIG. 1 shows an exemplary dynamic adaptive streaming over hypertext transfer protocol (DASH) system according to an embodiment of the disclosure.

FIG. 1 shows an exemplary session-based DASH system (100) according to an embodiment of the disclosure. In the session-based DASH system (100), an MPD file is sent from a DASH server (101) (e.g., a content server) to a DASH client (102). The DASH client (102) can receive media segments from the DASH server (101) based on the MPD file. The DASH client (102) can send a request to the DASH server (101) for updating the MPD file. In addition, the DASH client (102) can receive an SBD file from the DASH server (101) or a third party (e.g., session controller).

It is noted that multiple DASH servers can send MPD file and media segments, so the MPD file and the media segments can be sent to the DASH client (102) from different DASH servers. In addition, a DASH server receiving the request send from the DASH client (102) can be different from a DASH server sending the media segments.

According to aspects of the disclosure, the SBD file can include a plurality of time ranges and corresponding key-value pairs (or name-value pairs), along with additional metadata. The SBD file can be referenced in the MPD file by, for example, a URL. The SBD file can be used to customize the MPD file received by the DASH client (102) to be specific for a session of the DASH client (102). For example, the SBD file can allow adding session-specific elements to segment URLs without generating unique per-session MPDS.

Figure 2:
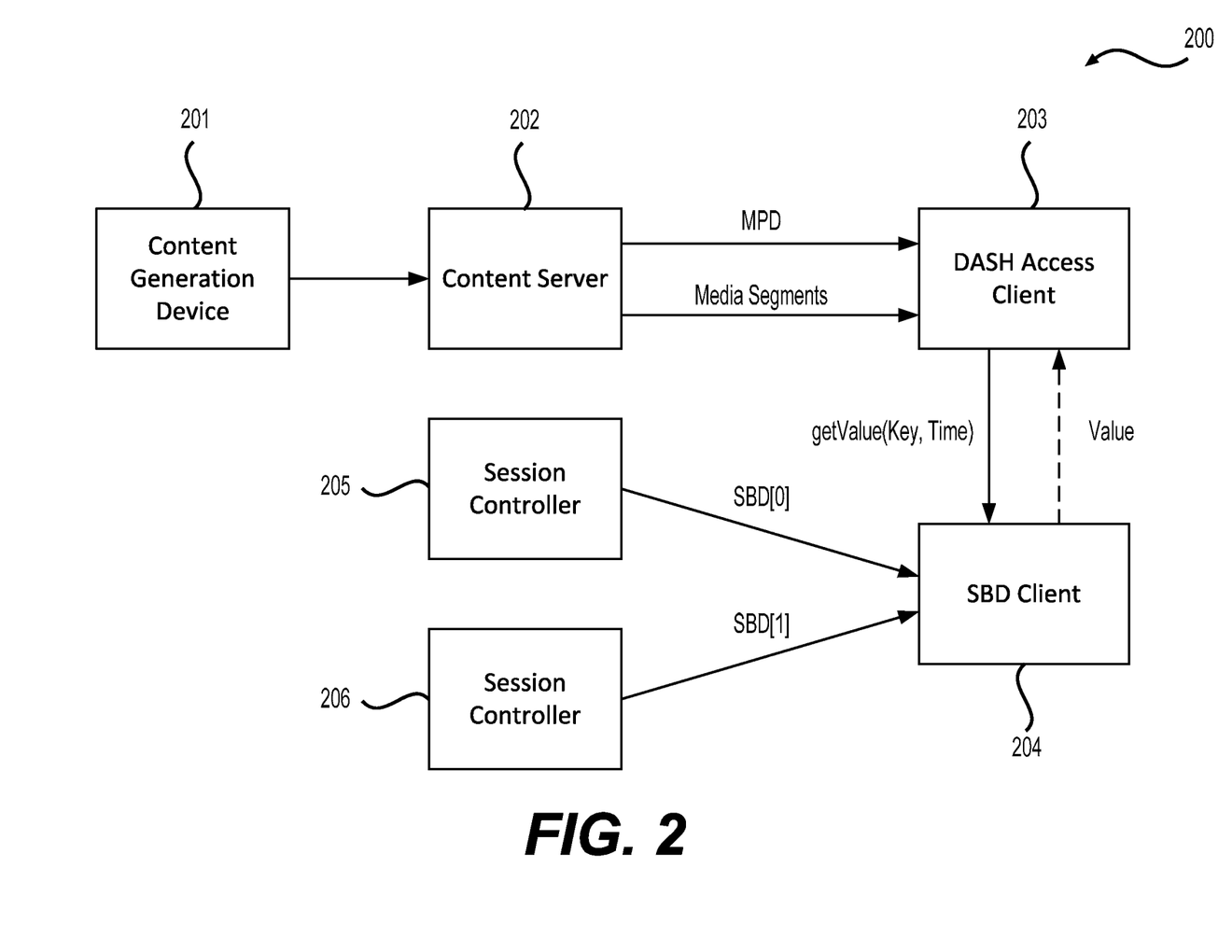
FIG. 2 shows another exemplary DASH system according to an embodiment of the disclosure.

FIG. 2 shows another exemplary session-based DASH system (200) according to an embodiment of the disclosure. In the session-based DASH system (200), multimedia content is prepared and generated by a content generation device (201) (e.g., smartphone) which can include an audio source (e.g., microphone) and a video source (e.g., video camera). The multimedia content can be stored by the content generation device (201) or sent to a content server (202) which can store various multimedia contents. The content server (202) can receive a request from client devices, such as a DASH access client (203), for one or more media segments of the multimedia content. The multimedia content is described by an MPD file, which can be stored and updated by the content server (202) and accessed by the client devices including the DASH access client (203) to retrieve the media segments.

In order to retrieve a session-specific media segment, the DASH access client (203) can send a request to an SBD client (204) (e.g., session client) for accessing an SBD file that is received by the SBD client (204) and includes a plurality of time ranges and corresponding key-value pairs for the current session. For example, the DASH access client (203) can send a key name and a time range to the SBD client (204), which then parses the key name and the time range and returns a value corresponding to the key name and the time range to the DASH access client (203). The DASH access client (203) can include the value in a query of a segment URL which can be sent to the content server (202) for requesting the session-specific media segment when the segment request is a HTTP GET or partial GET request.

It is noted that the SBD client (204) can receive multiple SBD files from different session controllers, such as a session controller (205) and a session controller (206).

According to aspects of the disclosure, any or all of the features of the content server (202) (e.g., DASH server) can be implemented on one or more devices of a content delivery network (CDN), such as routers, bridges, proxy devices, switches, or other devices. The content server (202) can include a request processing unit configured to receive network requests from the client devices (e.g., DASH access client (203)). For example, the request processing unit can be configured to receive HTTP GET or partial GET requests and provide data of multimedia contents in response to the requests. The requests can specify a segment using a URL of the segment. In some examples, the requests can also specify one or more byte ranges of the segment, thus comprising partial GET requests. The request processing unit can further be configured to service HTTP HEAD requests to provide header data of a segment.

In some embodiments, the content generation device (201) and the content server (202) can be coupled by a wireless network or a wired network, or can be directly communicatively coupled.

In some embodiments, the content generation device (201) and the content server (202) can be included in a same device.

In some embodiments, the content server (202) and the session controllers (205)-(206) can be included in a same device.

In some embodiments, the content server (202) and the DASH access client (203) can be coupled by a wireless network or a wired network.

In some embodiments, the SBD client (204) and the session controllers (205)-(206) can be coupled by a wireless network or a wired network, or can be directly communicatively coupled.

In some embodiments, the DASH access client (203) and the SBD client (204) can be included in a same device.

III. SBD Singling and Query Construction

In some related examples, certain descriptors in the MPD file, such as an essential property descriptor, are limited to the MPD level. In addition, the construction of the query of the request sent to a DASH server such as the DASH server (101) or (202) can be too complicated. To signal one or more desired key-value pairs and an SBD URL address where an SBD file can be received, a new element in the essential property descriptor can be used.

This disclosure presents methods for simplifying the signaling of the SBD URL address by using an attribute in a top-level descriptor and enabling the use of the top-level descriptor at multiple levels. For example, the same top-level descriptor can be allowed to be used at one or more of an MPD level, a period level, an adaptation set level, and a representation level. The SBD URL address can be explicitly signaled in the attribute in the top-level descriptor, for example, by using a value attribute of the essential property descriptor. In addition, a desired key for constructing the query of the request can be signaled in a child element of the top-level descriptor. The child element of the top-level descriptor can also include a default value corresponding to the desired key. If the desired key is found in the SBD file, a value corresponding to the desired key in the SBD file can be used for constructing the query of the request. Otherwise, if the key is not found in the SBD file, the default value in the child element of the top-level descriptor can be used for constructing the query of the request.

According to the aspects of the disclosure, the top-level descriptor can be an essential property descriptor and the attribute used for signaling the SBD URL address can be a value attribute of the essential property descriptor. The child element of the top-level descriptor can be a key-value element in the essential property descriptor. The key-value element can include a key list attribute indicating one or more desired keys and a default value attribute indicating a default value for each of the one or more desired keys.

Table 1 shows an exemplary top-level descriptor for session-based DASH operations according to an embodiment of the disclosure.

TABLE 1

| Element or Attribute Name | Use | Description |
| --- | --- | --- |
| EssentialProperty | | Instantiation of EssentialProperty for session-based DASH operations |
| @schemeIdUri | M (string) | Shall have the value "urn:mpeg:dash:sbd:2019". |
| @value | M (string) | shall be set to the URL of the SBD file for this session. |
| KeyValuePair | 0 . . . N | Defines one or more session-based parameters. If absent, the session-based parameters are defined in the SBD file located at URL in @value. |

Legend:
For attributes: M = Mandatory, O = Optional, OD = Optional with Default Value, CM = Conditionally Mandatory.
For elements: <minOccurs> . . . <maxOccurs> (N = unbounded)
Note that the conditions only holds without using xlink:href. If linking is used, then all attributes are "optional" and <minOccurs=0>
Elements are bold; attributes are non-bold and preceded with an @.

In the table 1, the essential property descriptor includes a scheme attribute @schemeIdUri, which can be set as "urn:mpeg:dash:sbd:2019" for example. The URL of the SBD file is indicated by a value attribute @value in the essential property descriptor. Based on the URL address, a client such as the DASH client (102) or the SBD client (204) can receive the SBD file. In addition, the essential property descriptor includes a key-value element KeyValuePair, which can be used to acquire one or more session-based parameters such as a plurality of key-value pairs in the SBD file. For example, the key-value element can include a key list attribute that indicates one or more keys for constructing the query of the request. For each of the one or more keys, the key-value element can also include a default value of the respective key. If a key indicated by the key list attribute can be found in the SBD file, a value associated with the key in the SBD file can be used for constructing the query of the request. Otherwise, the default value associated with the key in the key-value element can be used for constructing the query of the request.

Table 2 shows an exemplary key-value element for session-based DASH operations according to an embodiment of the disclosure.

TABLE 2

| Element or Attribute Name | Use | Description |
| --- | --- | --- |
| KeyValuePair | | provides information on multiple parameters applying to the same time range (e.g., same (sub)segment) in the query string. |
| @id | M | the value of the corresponding KeyValueTimeline@id in the SBD file to be used for constructing the query. If a match is not found in the SBD file, the default value shall be added to all keys of @keyList. In the case of no match is found and @keyList is not present, no query is added. |
| @keyList | O (string) | lists keys matching keys listed in the KeyValueTimeline@keyList attribute in the SBD file. If a key is listed in this attribute but does not appear in KeyValueTimeline@keyList, the default value of the key shall be returned for all time ranges. The key-value pairs of this list shall be added to the segment request URL query. The key and value in each key-value pair is separated by '=' and every two consecutive key-value pairs are separated by '&'. The order of key-value pairs in the query are defined by the SBD file. If absent, all keys in the SBD files shall be added to the corresponding segment request URL query. |
| @default | OD | if SBD does not provide a value for a specific time range, the value of this attribute shall be used instead. If absent, the value is the string "null". |

Legend:
For attributes: M = Mandatory, O = Optional, OD = Optional with Default Value, CM = Conditionally Mandatory.
For elements: <minOccurs> . . . <maxOccurs> (N = unbounded)
Note that the conditions only holds without using xlink:href. If linking is used, then all attributes are "optional" and <minOccurs=0>
Elements are bold; attributes are non-bold and preceded with an @.

In the table 2, the key-value element is used for providing information on multiple parameters applying to the same time range (e.g., same (sub)segment) in the query of the request. The key-value element includes an identification (ID) attribute @id, a key list attribute @keylist, and a default value attribute @default. The key list attribute can indicate one or more desired keys, and the default value attribute can indicate a default value for each of the one or more desired keys. The ID attribute is used to select one group of key-value pairs in the SBD file.

In an embodiment, the SBD file can include one or more groups of key-value pairs, each group corresponding to a different time interval (e.g., timeline) or segment order (e.g., orderline) and being identified by an ID attribute of the respective group. Accordingly, if a value of the ID attribute in the key-value element corresponds to a value of an ID attribute (e.g., Key ValueTimeline@id) of one group of key-value pairs in the SBD file, the group of key-value pairs can be selected for constructing the query of the request. However, if the value of the ID attribute in the key-value element does not correspond to any value of the ID attributes of the one or more groups of key-value pairs in the SBD file, the key list attribute in the key-value element can be examined. If the key list attribute in the key-value element indicates one or more desired keys, a value associated with each of the one or more desired keys indicated by the default value attribute can be used for constructing the query of the request. If the key list attribute in the key-value element does not indicate any desired key, no query is added to the request.

In an embodiment, if the value of the ID attribute in the key-value element corresponds to a value of an ID attribute (e.g., KeyValueTimeline@id) of one group of key-value pairs in the SBD file, the group of key-value pairs in the SBD file is selected for constructing the query of the request. Then, if the key list attribute in the key-value element does not indicate any desired key, the entire selected group of key-value pairs in the SBD file can be used for constructing the query of the request.

However, if the key list attribute in the key-value element indicates one or more desired keys, it can be determined whether each of the one or more desired keys can be found in a key list attribute of the selected group of key-value pairs in the SBD file. If one of the one or more desired keys corresponds to a key indicated by the key list attribute of the selected group of key-value pairs in the SBD file, a value associated with the key indicated by the key list attribute of the selected group of key-value pairs in the SBD file can be used for constructing the query of the request. For example, the key and the associated value in a key-value pair in the query can be separated by '='. If multiple keys in the one or more desired keys can be found in the key list attribute of the selected group of key-value pairs in the SBD file, every two consecutive key-value pairs in the query can be separated by '&' for example. The order of the key-value pairs in the query can be defined by the SBD file. However, if one of the one or more desired keys does not correspond to any key indicated by the key list attribute of the selected group of key-value pairs in the SBD file, a default value associated with the one of the one or more desired keys indicated by the default value attribute in the key-value element can be used for constructing the query of the segment for all time ranges.

According to aspects of the disclosure, a multipurpose Internet mail extensions (MIME) type of the SBD file is not signaled. In an embodiment, the MIME type of the SBD file can be predefined, such as text/xml+sbd for extensible markup language (XML) and application/json+sbd for JavaScript object notation (JSON). Accordingly, both the server and the client-side application can recognize the MIME type and signaling the MIME type for the SBD file in the MPD is not necessary.

The disclosure presents methods for simplifying signaling of the URL information of the SBD file by using an attribute of a top-level descriptor (e.g., the value attribute in the essential property descriptor) in the MPD. Accordingly, the URL information can be parsed at a top-level element and is not needed to be parsed at a child element, resulting in a more compact manifest (e.g., MPD), a faster parsing process, and a lower memory requirement for a DASH client.

In addition, the use of the top-level descriptor can be enabled at multiple levels. For example, the top-level descriptor can be used at one or more of an MPD level, a period level, an adaptation set level, and a representation level. Accordingly, other descriptors for SBD may not be used. For example, a supplemental property descriptor may not be used for SBD at the period level.

It is noted that a first top-level descriptor used at a lower level such as the adaptation level can overwrite a second top-level descriptor used at a higher level such as the MPD level. Both the first top-level descriptor and the second top-level descriptor can have the same attributes but may have different values for one attribute.

According to aspects of the disclosure, a desired key for the query construction can be explicitly signaled in a child element of the top-level descriptor, resulting in a more compact manifest, and a simpler content creation process, and a lower processing complexity for a DASH client.

According to aspects of the disclosure, an MIME type of the SBD file is not signaled in the MPD. The MIME type of the SBD file can be a single predefined type so that handling and file management of the SBD file becomes simpler and the MPD does not need to recognize the SBD file, resulting in a simpler manifest, a consistent file processing for a DASH client, and an easier file management and handling for both a DASH server and the DASH client.

IV. Flowchart

Figure 3:
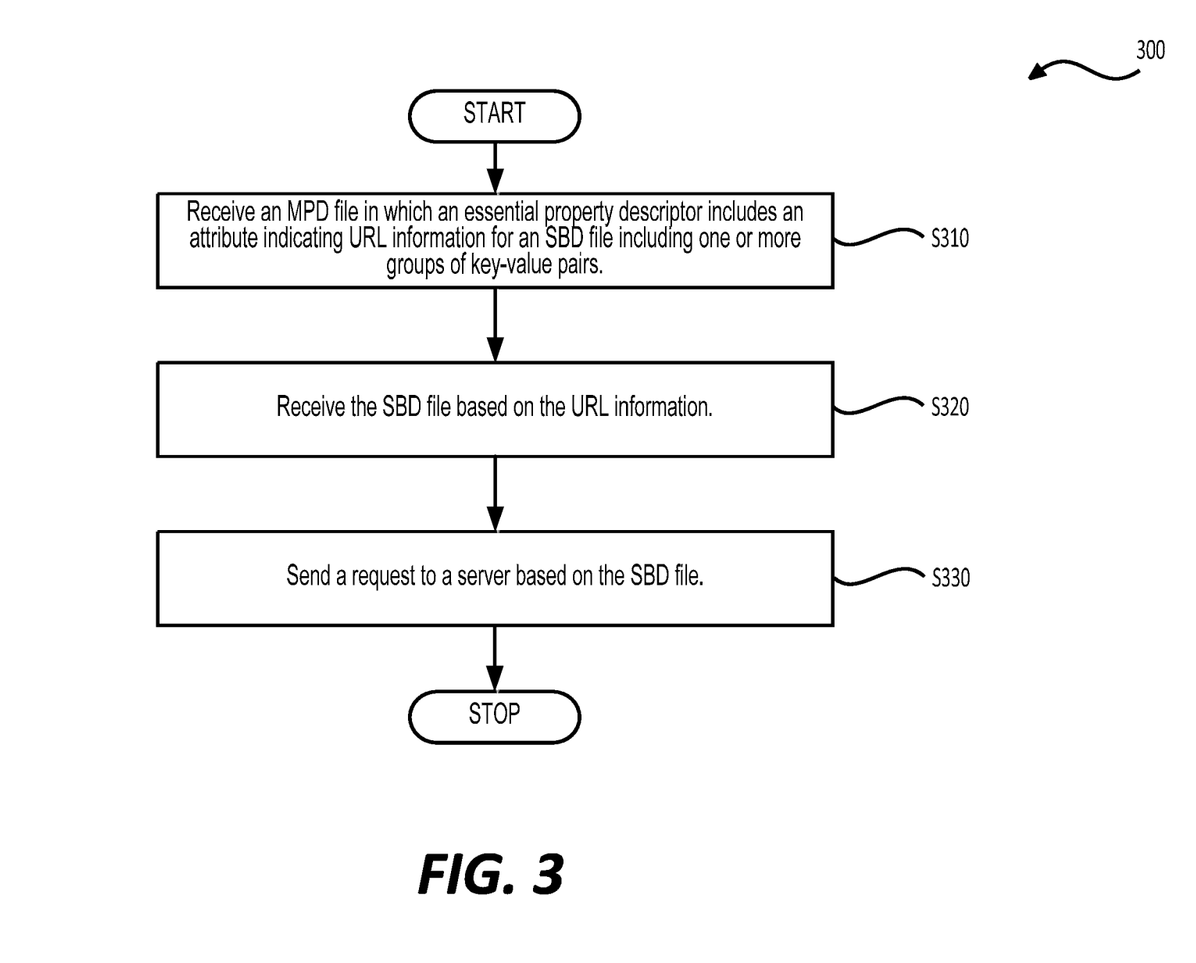
FIG. 3 shows a flow chart outlining a process example in accordance with some embodiments.

FIG. 3 shows a flow chart outlining a process (300) according to some embodiments of the disclosure. In various embodiments, the process (300) is executed by processing circuitry, such as the processing circuitry in the DASH client (102). In some embodiments, the process (300) is implemented in software instructions, thus when the processing circuitry executes the software instructions, the processing circuitry performs the process (300). The process (300) starts at (S310), where the process (300) receives an MPD file in which an essential property descriptor includes an attribute indicating URL information for an SBD file including one or more groups of key-value pairs. Then, the process (300) proceeds to step (S320).

At step (S320), the process (300) receives the SBD file based on the URL information. Then, the process (300) proceeds to step (S330).

At step (S330), the process (300) sends a request to a server based on the SBD file. Then, the process (300) terminates.

In an embodiment, the essential property descriptor is at one of an MPD level, a period level, an adaptation set level, and a representation level.

In an embodiment, a query of the request is constructed based on a key-value element included in the essential property descriptor and the SBD file.

In an embodiment, whether a value of an ID attribute included in the essential property descriptor corresponds to a value of an ID attribute included in one of the one or more groups of key-value pairs in the SBD file is determined.

In an embodiment, whether a desired key in a key list attribute included in the key-value element corresponds to a key in a key list attribute included in the one of the one or more groups of key-value pairs in the SBD file is determined based on the value of the ID attribute included in the essential property descriptor being determined to correspond to the value of the ID attribute included in the one of the one or more groups of key-value pairs in the SBD file.

In an embodiment, the query of the request is constructed based on a value associated with the key in the key list attribute included in the one of the one or more groups of key-value pairs in the SBD file based on the desired key in the key list attribute included in the key-value element being determined to correspond to the key in the key list attribute included in the one of the one or more groups of key-value pairs in the SBD file.

In an embodiment, the query of the request is constructed based on a default value associated with the desired key in the key list attribute in the key-value element based on the desired key in the key list attribute in the key-value element being determined not to correspond to any key in the key list attribute included in the one of the one or more groups of key-value pairs in the SBD file.

In an embodiment, whether the key list attribute included in the key-value element includes at least one desired key is determined based on the value of the ID attribute included in the key-value element being determined not to correspond to any value of the ID attribute included in the one or more groups of key-value pairs in the SBD file.

In an embodiment, the query of the request is constructed based on a default value associated with each of the at least one desired key in the key list attribute in the key-value element based on the key list attribute included in the key-value element being determined to include at least one desired key.

In an embodiment, an MIME type of the SBD file is not signaled.

Figure 4:
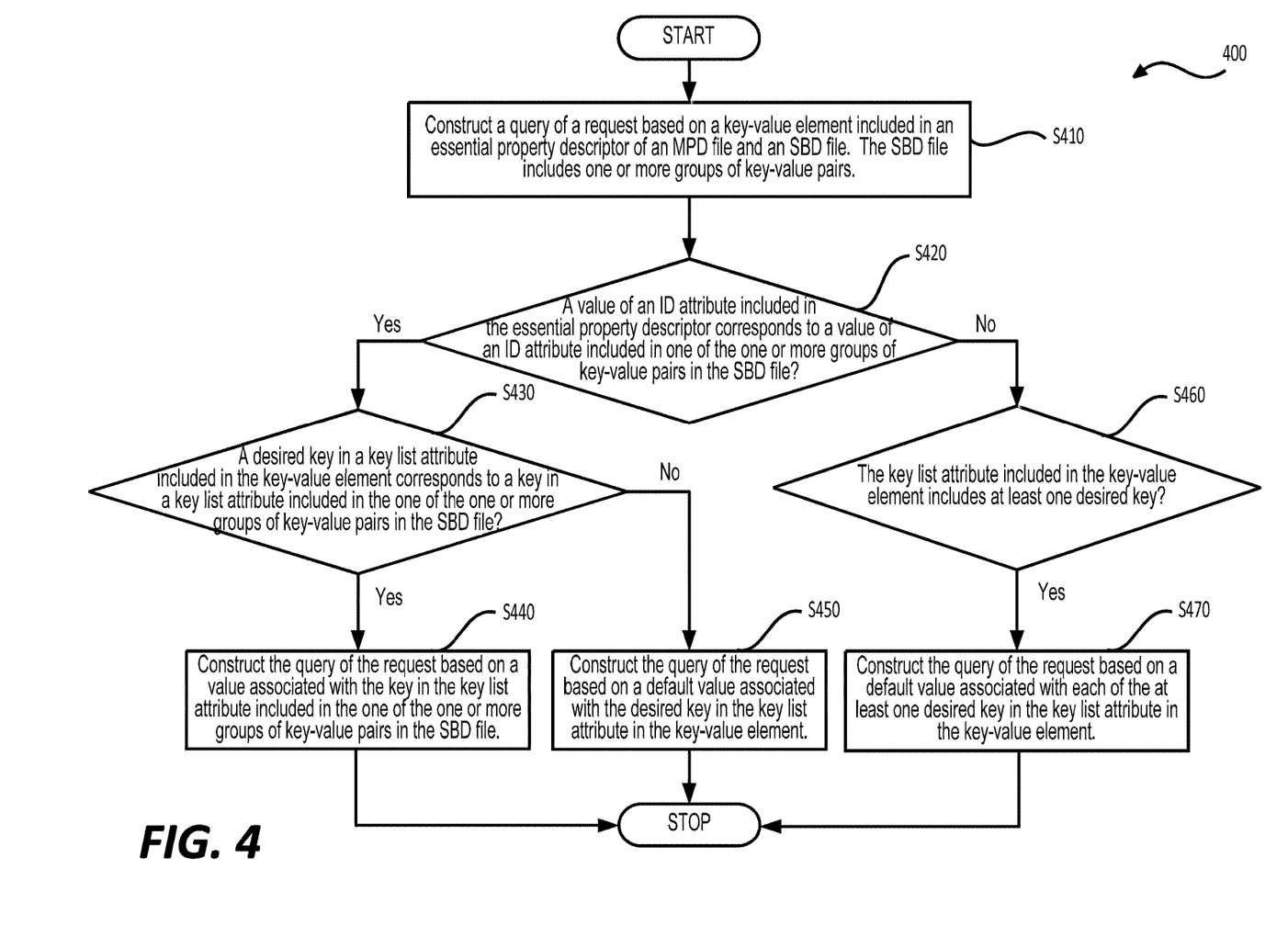
FIG. 4 shows another flow chart outlining a process example in accordance with some embodiments.

FIG. 4 shows another flow chart outlining a process (400) according to some embodiments of the disclosure. In various embodiments, the process (400) is executed by processing circuitry, such as the processing circuitry in the DASH client (102). In some embodiments, the process (400) is implemented in software instructions, thus when the processing circuitry executes the software instructions, the processing circuitry performs the process (400). The process (400) starts at (S410), where the process (400) constructs a query of a request (e.g., the request in in the process (300)) based on a key-value element included in an essential property descriptor of an MPD file (e.g., the MPD file in in the process (300)) and an SBD file. The SBD file includes one or more groups of key-value pairs, such as the SBD file in the process (300). Then, the process (400) proceeds to step (S420).

At step (S420), the process (400) determines whether a value of an ID attribute included in the essential property descriptor corresponds to a value of an ID attribute included in one of the one or more groups of key-value pairs in the SBD file. When the value of the ID attribute included in the essential property descriptor corresponds to the value of the ID attribute included in the one of the one or more groups of key-value pairs in the SBD file, the process (400) proceeds to step (S430). Otherwise, the process (400) proceeds to step (S460).

At step (S430), the process (400) determines whether a desired key in a key list attribute included in the key-value element corresponds to a key in a key list attribute included in the one of the one or more groups of key-value pairs in the SBD file. When the desired key in the key list attribute included in the key-value element corresponds to the key in the key list attribute included in the one of the one or more groups of key-value pairs in the SBD file, the process (400) proceeds to step (S440). Otherwise, the process (400) proceeds to step (S450).

At step (S440), the process (400) constructs the query of the request based on a value associated with the key in the key list attribute included in the one of the one or more groups of key-value pairs in the SBD file.

At step (S450), the process (400) constructs the query of the request based on a default value associated with the desired key in the key list attribute in the key-value element.

At step (S460), the process (400) determines whether the key list attribute included in the key-value element includes at least one desired key. When the key list attribute included in the key-value element includes at least one desired key, the process (400) proceeds to step (S470).

At step (S470), the process (400) constructs the query of the request based on a default value associated with each of the at least one desired key in the key list attribute in the key-value element. Then, the process (400) terminates.

V. Computer System

The techniques described above, can be implemented as computer software using computer-readable instructions and physically stored in one or more computer-readable media. For example, FIG. 5 shows a computer system (500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
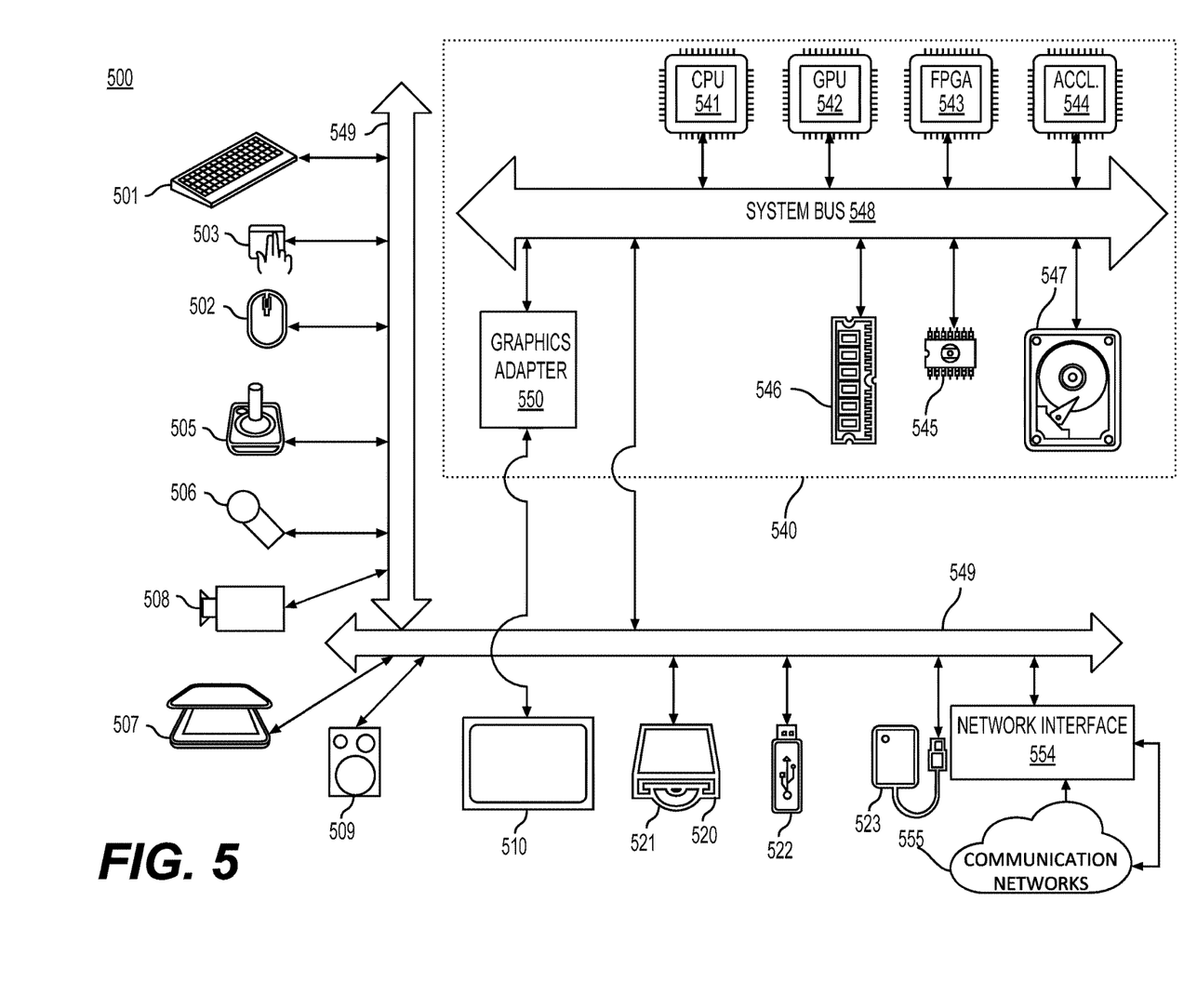
FIG. 5 is a schematic illustration of a computer system in accordance with an embodiment.

The components shown in FIG. 5 for computer system (500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (500).

Computer system (500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (501), mouse (502), trackpad (503), touch screen (510), data-glove (not shown), joystick (505), microphone (506), scanner (507), and camera (508).

Computer system (500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (510), data-glove (not shown), or joystick (505), but there can also be tactile feedback devices that do not serve as input devices), audio output devices (such as: speakers (509), headphones (not depicted)), visual output devices (such as screens (510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (510)) can be connected to a system bus (548) through a graphics adapter (550).

Computer system (500) can also include human accessible storage devices and their associated media such as optical media including CD/DVD ROM/RW (520) with CD/DVD or the like media (521), thumb-drive (522), removable hard drive or solid state drive (523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (500) can also include a network interface (554) to one or more communication networks (555). The one or more communication networks (555) can for example be wireless, wireline, optical. The one or more communication networks (555) can further be local, wide-area, metropolitan, vehicular and industrial, real-time, delay-tolerant, and so on. Examples of the one or more communication networks (555) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (549) (such as, for example USB ports of the computer system (500)); others are commonly integrated into the core of the computer system (500) by attachment to a system bus as described below (for example Ethernet interface into a PC computer system or cellular network interface into a smartphone computer system). Using any of these networks, computer system (500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (540) of the computer system (500).

The core (540) can include one or more Central Processing Units (CPU) (541), Graphics Processing Units (GPU) (542), specialized programmable processing units in the form of Field Programmable Gate Areas (FPGA) (543), hardware accelerators for certain tasks (544), and so forth. These devices, along with Read-only memory (ROM) (545), Random-access memory (546), internal mass storage such as internal non-user accessible hard drives, SSDs, and the like (547), may be connected through the system bus (548). In some computer systems, the system bus (548) can be accessible in the form of one or more physical plugs to enable extensions by additional CPUs, GPU, and the like. The peripheral devices can be attached either directly to the core's system bus (548), or through a peripheral bus (549). Architectures for a peripheral bus include PCI, USB, and the like.

CPUs (541), GPUs (542), FPGAs (543), and accelerators (544) can execute certain instructions that, in combination, can make up the aforementioned computer code. That computer code can be stored in ROM (545) or RAM (546). Transitional data can be also be stored in RAM (546), whereas permanent data can be stored for example, in the internal mass storage (547). Fast storage and retrieve to any of the memory devices can be enabled through the use of cache memory, that can be closely associated with one or more CPU (541), GPU (542), mass storage (547), ROM (545), RAM (546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (500) and specifically the core (540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (540) that are of non-transitory nature, such as core-internal mass storage (547) or ROM (545). The software implementing various embodiments of the present disclosure can be stored in such devices and executed by core (540). A computer-readable medium can include one or more memory devices or chips, according to particular needs. The software can cause the core (540) and specifically the processors therein (including CPU, GPU, FPGA, and the like) to execute particular processes or particular parts of particular processes described herein, including defining data structures stored in RAM (546) and modifying such data structures according to the processes defined by the software. In addition or as an alternative, the computer system can provide functionality as a result of logic hardwired or otherwise embodied in a circuit (for example: accelerator (544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for receiving media data, the method comprising:

receiving a media presentation description (MPD) file including an essential property descriptor, the essential property descriptor including (i) an attribute that is associated with a session-based description (SBD) file and (ii) a key-value element;

determining a value in the SBD file corresponding to a key in the key-value element; and sending a request to a server based on the corresponding value.

2. The method of claim 1, wherein the attribute indicates uniform resource locator (URL) information for the SBD file.

3. The method of claim 1, wherein the essential property descriptor is included at one of an MPD level, a period level, an adaptation set level, and a representation level.

4. The method of claim 1, further comprising:
constructing a query of the request based on the corresponding value.

5. The method of claim 1, further comprising:
determining whether the key in the key-value element is included in the SBD file.

6. The method of claim 5, wherein the determining the value in the SBD file includes determining the value in the SBD file corresponding to the key in the key-value element based on the key in the key-value element being included in the SBD file.

7. The method of claim 5, further comprising:
determining a default value for the key based on the key in the key-value element not being included in the SBD file, the default value being included in the key-value element.

8. The method of claim 7, wherein the sending includes sending the request to the server based on the default value.

9. The method of claim 1, wherein a multipurpose Internet mail extensions (MIME) type of the SBD file is not signaled.

10. An apparatus, comprising:
processing circuitry configured to:
receive a media presentation description (MPD) file including an essential property descriptor, the essential property descriptor including (i) an attribute that is associated with a session-based description (SBD) file and (ii) a key-value element;
determine a value in the SBD file corresponding to a key in the key-value element; and
send a request to a server based on the corresponding value.

11. The apparatus of claim 10, wherein the attribute indicates uniform resource locator (URL) information for the SBD file.

12. The apparatus of claim 10, wherein the essential property descriptor is included at one of an MPD level, a period level, an adaptation set level, and a representation level.

13. The apparatus of claim 10, wherein the processing circuitry is further configured to:
construct a query of the request based on the corresponding value.

14. The apparatus of claim 10, wherein the processing circuitry is further configured to:
determine whether the key in the key-value element is included in the SBD file.

15. The apparatus of claim 14, wherein the processing circuitry is further configured to:
determine the value in the SBD file corresponding to the key in the key-value element based on the key in the key-value element being included in the SBD file.

16. The apparatus of claim 14, wherein the processing circuitry is further configured to:
determine a default value for the key based on the key in the key-value element not being included in the SBD file, the default value being included in the key-value element.

17. The apparatus of claim 16, wherein the processing circuitry is further configured to:
send the request to the server based on the default value.

18. The apparatus of claim 10, wherein a multipurpose Internet mail extensions (MIME) type of the SBD file is not signaled.

19. A non-transitory computer-readable storage medium storing instructions which, when executed by a computer for receiving media data, cause the computer to perform:
receiving a media presentation description (MPD) file including an essential property descriptor, the essential property descriptor including (i) an attribute that is associated with a session-based description (SBD) file and (ii) a key-value element;
determining a value in the SBD file corresponding to a key in the key-value element; and
sending a request to a server based on the corresponding value.

20. The non-transitory computer-readable storage medium of claim 19, wherein the attribute indicates uniform resource locator (URL) information for the SBD file.

* * * * *